Jan. 10, 1950
P. A. NEWMAN
2,493,994
ANTISKID DEVICE
Filed July 11, 1946
2 Sheets-Sheet 1
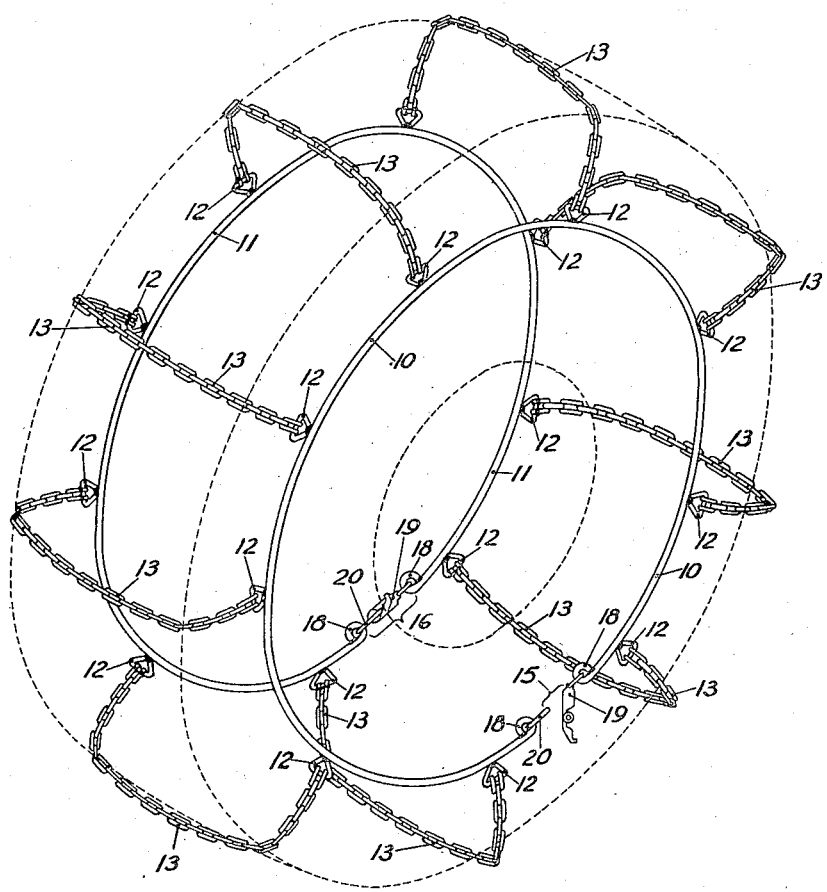
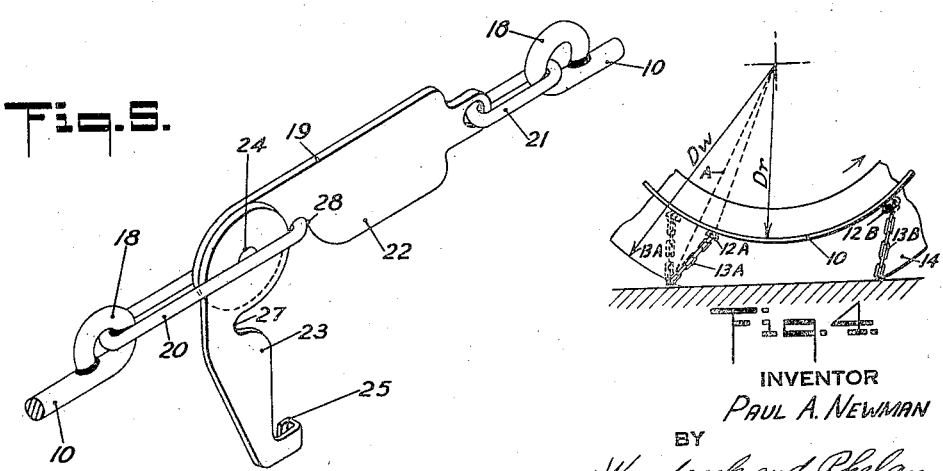
INVENTOR
PAUL A. NEWMAN
BY
Woodcock and Phelan
ATTORNEYS Jan. 10, 1950
P. A. NEWMAN
2,493,994
ANTISKID DEVICE
Filed July 11, 1946
2 Sheets-Sheet 2
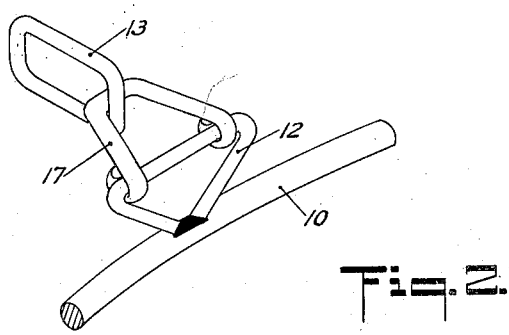
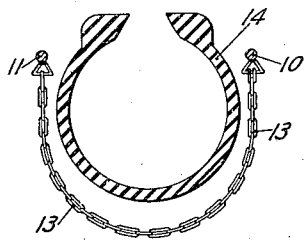
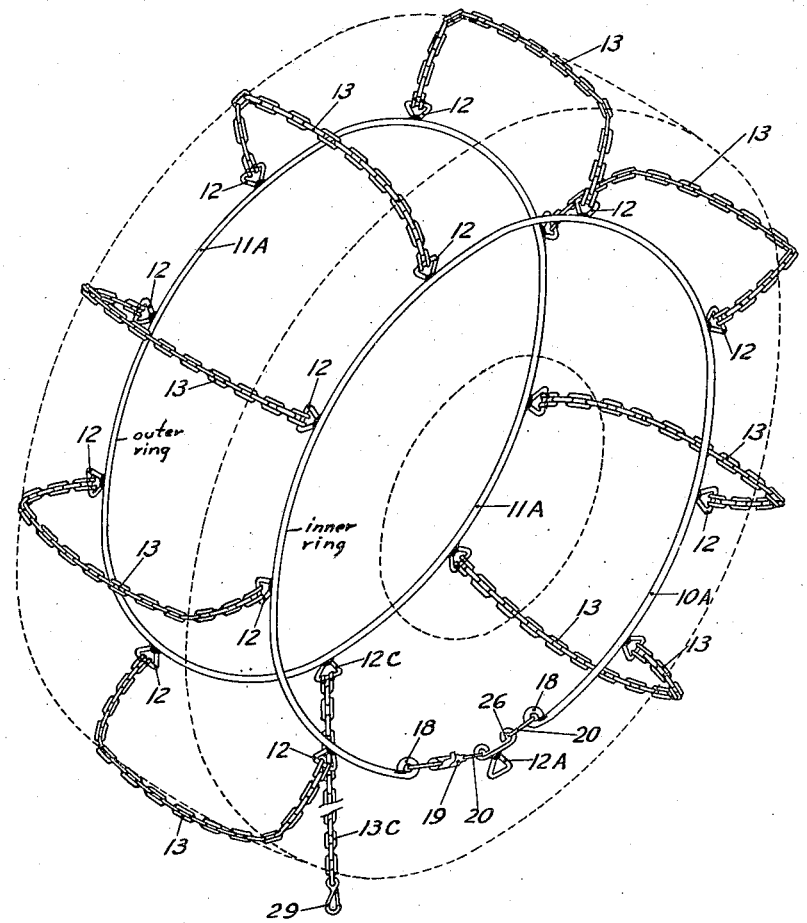
INVENTOR
PAUL A. NEWMAN
BY
Woodcock and Phelan
ATTORNEYS Patented Jan. 10, 1950

2,493,994

UNITED STATES PATENT OFFICE 2,493,994

ANTISKID DEVICE

Paul A. Newman, Philadelphia, Pa.

Application July 11, 1946, Serial No. 682,879

7 Claims. (Cl. 152—242)

This invention relates to anti-skid devices for the wheels of automobiles and other self-propelled vehicles.

In accordance with the invention, the anti-skid device, which can be readily mounted as a unit without need to jack up the wheel, comprises a pair of rings for disposition on opposite sides of the wheel and one or both of which are of resilient one-piece construction and provided with a gap which allows the ring temporarily to be expanded for, and during, mounting or dismounting of the device.

Furthermore, the diameter of the rings and the length and spacing of the cross-chains extending between them are so related to the wheel dimensions that there is attained a toggle action which maintains effective traction and quiet operation of the anti-skid device.

The invention further resides in features of construction and arrangement hereinafter described and claimed.

For a more detailed understanding of the invention, reference is made to the accompanying drawings, in which:

Fig. 1 is a perspective view of one form of anti-skid device;

Fig. 2 is a detailed view in perspective and on enlarged scale of a preferred mode of connecting the cross-chains to the rings;

Fig. 3 is an explanatory view referred to in discussion of the relation of the chain ring and wheel dimensions;

Fig. 4 is a fragmentary view referred to in discussion of the desired toggle action;

Fig. 5, in perspective and on enlarged scale, illustrates one form of gap-closing device; and Fig. 6 is a perspective view of a modified form of anti-skid device.

Referring to Fig. 1, one ring, such as the inner ring 10, is of a strong resilient material such as steel or other suitable metal which, for use with the wheels of standard passenger automobiles, may have a cross-sectional area substantially equal to that of a circle of one-eighth inch to three-eighths inch diameter although the cross-section may be other than circular; for example, rectangular. The eye members 12 for attachment to the ring 10 of corresponding ends of each of cross-chains 13 are substantially equally spaced peripherally of the ring and are preferably permanently fastened thereto, as by welding. The eye members or loops 12 are positioned to extend radially from the ring and to lie substantially in a common plane therewith. Preferably, each end of each cross-chain 13 is received by a U-shaped anchoring member 17, Fig. 2, whose free ends are curled loosely to embrace the bar portion of the corresponding eye member 12, and spread to eliminate twisting of the cross-chains.

As shown in Fig. 1, the inner ring 10 is an open ring having a gap 15 between the terminal portions 18, 18 of the ring. The inner ring may be sprung or expanded so that the device can be mounted with the wheel in position on the car and in contact with the ground and with the cross-chains 13 anchored to the rings. The outer ring 11, provided with a gap 16, may be of similar construction having spaced eye members 12 to which are secured the other ends of the cross-chains 13. When both rings are provided with a gap, either may be used as the inner ring: the gaps 15 and 16 are aligned as shown.

In the preferred procedure for mounting the device, the inner ring is grasped on opposite sides of the gaps with the device in such position the gaps are at the bottom. The upper end of the device is then slipped up and under the mud guards, if the vehicle be provided with them. Then the ring is expanded by widening the gaps 15 and the inner ring, then while stressed having a larger diameter than the tire, is slipped over it. The ring is then released and, due to its resilience, springs back to normal, unstressed diameter, less than that of the tire. The one-piece construction of the rings is of great advantage in mounting of the device because preventing its collapse and tangling of the chains. The device embodying the invention can be put on a wheel by procedure which can be simply and quickly performed, even under adverse conditions. The one-piece ring construction also ensures that as stowed in or on a vehicle the cross-chains will not be come entangled and so cause delay in mounting of the device.

With the chains in their final position, the length of the gap 15 or 16 is less than 90 degrees and preferably is from about 15 degrees to 30 degrees, depending upon the dimensions and material of the ring.

For tires of standard wheel diameter and cross-sectional area, the diameter of the inner and outer rings 10 and 11 should be from about 0.8 to about 0.85 times the outside diameter of the wheel or tire. If the ring diameter is much less than the lower limit, it is difficult or impossible to expand it sufficiently to fit over the tire if the ring is sufficiently strong and elastic to spring back to normal diameter. If the ring diameter is much greater than the upper limit above given, the cross-chains will be so short that the device will in operation slip with respect to the tire, with resultant loss of traction and damage to the tire. With the proper ring diameter and cross-chain length, the cross-chains as hereinafter explained in discussion of Fig. 4 have a toggle action which insures effective traction.

With rings of proper diameter and cross-chains of proper length, the relations between the tire, chains, and rings are generally as shown in Fig. 3; that is, assuming the tire or wheel is suspended free of the ground, the distance between the base of the bottom chain loop and the tread of the tire is of the order of an inch or so. Actually, since the rings 10 and 11 are free or floating with respect to the wheel and tire, each chain and ring portion directly associated therewith assumes varying positions with respect to the wheel during rotation thereof.

With the proper dimensions of the ring and chain, determined as aforesaid, there is attained the toggle action shown in Fig. 4. As each cross-chain 13 in turn approaches the dotted-line position of chain 13A, the lower portion of the chain engages the ground and momentarily remains stationary until the corresponding eye member 12A moves from the dotted-line position beyond the line of centers A to the full-line position to extent sufficient to take up the slack, whereupon the cross-chains on the rising side of the tire tightly grip it. During continued rotation of the wheel through the angle for which the cross-chain 13A remains in contact with the ground, it is held fast to the tire in this over-center toggle position so that for this part of a revolution of the wheel the cross-chain is firmly held to it.

Furthermore, to insure quiet operation of the anti-skid device the angular spacing between the eye members 12 is such that one or another of the cross-chains is at all times in contact with the ground; that is, the minimum angular spacing is preferably such that one cross-chain 13A, Fig. 4, is being pinched by the wheel against the ground at about the time or just before the time at which another cross-chain 13B is leaving the ground. For the standard pneumatic tires used on present passenger automobiles, the minimum spacing is about 40 degrees; that is, the anti-skid device should have nine or more cross-chains.

At low running speeds, or for temporary use in pulling out of a ditch, it is not necessary that the gap in the inner ring or the gaps in both rings, if they are both of the gap-construction type, be closed because the stiffness afforded by the one-piece construction of the rings and the toggle action are sufficient to prevent the gap or gaps from being extended sufficiently to allow the device to be thrown off the wheel. For high-speed running, the gap is closed as by the disengageable locking members 19 and 20. As shown more clearly in Fig. 5, the clamping member 19 comprises a body portion 22 which is connected or attached to one of the terminal portions 18 of ring 10; preferably by one or more links 21. To the body portion, there is pivotally connected a clamp member 23 preferably having a notch or groove 27 to receive the end of a loop member 20, suitably connected or attached to the other terminal portion 18 of the ring. With the parts in the position shown in Fig. 5, the members 19 and 20 may be completely disengaged and separated, thus to open the gap 15 or 16 and so allow the associated ring to be expanded in mounting or dismounting of the anti-skid device. To close and lock the gap, the clamp member 25 is swung in counterclockwise direction about its pivot pin 24 to bring the engaged end of the loop member 20 into the opening formed by the notch 27 and the complementary notch 28 in the body member 19.

The clamp member 23 is held in the closed position by the engagement between its hooked end 25 and the body member 19. To unlock the clamp, the member 23 is first swung slightly in counterclockwise direction to effect disengagement of the hooked end 25 thereof from body member 19: it is then sprung outwardly slightly to clear the body portion 19 and so permit its rotation in clockwise direction to the position shown in Fig. 5. Preferably, the link 21 is rigidly attached as by welding to ring 10 on one side of the gap 15 and member 20 similarly rigidly attached to the other side of the gap. With such gap-closing arrangement using only a single free member, it is simple to lock and unlock the clamp by reaching behind the tire with one hand.

In the form of my invention shown in Fig. 6, the outer ring 11A is continuous. With this construction in which only one of the rings may be expanded, it is usually desirable to provide for disconnection of at least one end of one of the cross-chains. For example, cross-chain 13C may be provided with a harness hook 29 or equivalent which in mounting or dismounting of the device is unclamped from the eye member 12C of the outer or front ring 11A or alternatively, and, as shown, the cross-chain may be permanently attached to the outer ring and its other end provided with a releasable clip 29 or equivalent.

In some cases, and whether the device be of the single split ring or double split ring construction, it may be desirable to provide a gap somewhat greater than that shown in Fig. 1, in which event the gap-closing means includes a link 26 to which is attached an eye member 12A for attachment of one of the cross-chains. Unless the cross-chain spacing is unusually close, not more than two cross-chains should be so connected to the gap-closing structure.

With the construction shown in Fig. 6, the device is dismounted by releasing the clip or hook 29, bringing the wheel to position at which the members 19 and 20 may be disengaged, and then further moving the wheel so that all cross-chains are out of contact with the ground. The ring 10A is then expanded so that it may be slipped over the wheel. The device is mounted by performing these same operations in reverse sequence and, of course, as in the case of the device shown in Fig. 1, without need to jack up the car or remove the wheel from contact with the ground. The advantage of using the wider gap is that after the device has been slipped on a wheel, it is possible to reach and close the lock or clamp 29 without first moving the car forward or back. The drop link 13C can temporarily be hooked by its clip 29 to one of the adjacent chains and need not be attached to eye member 12A if the device is to be used only for a short time, as in pulling out of a hole or ditch.

In both forms of the invention above described, the chains or anti-skid devices are to substantial degree characterized by the provision of substantial clearance (or the loose fitting relationship) between the individual links and the tire. By providing such clearance together with links which are long enough to encircle the tire not only around its road-engaging surface but also along the sides thereof, the aforesaid toggle action provides a positive drive connection between the road bed, through the chain and to the tire itself, thus providing the needed traction for operation of the car. Coupled with the toggle action is the gripping action of the sides of the chain against the sides of the tire; this gripping action, in fact, extending through the encircled portion of the tire and resembling the action of a climber's rope which, when it is taut and in encircling relation on the tree, does not slip but forms a good mechanical connection therewith. As a matter of fact, as applied to the chains or anti-skid devices, this gripping action increases with increased torque; thus, at a time when maximum torque is required to move the car or vehicle the maximum forces are exerted to prevent slippage and thus to lock the chain to the tire in the achievement of maximum traction. Notwithstanding the clearances and play provided, the fact that the diameter of the inner and outer rings is selected with respect to the diameter of the tire, as above outlined, the chains under high-speed operation are not moved outwardly enough to strike the mud guards or fenders. Thus, the present anti-skid devices or chains operate by virtue of principles not heretofore taken advantage of by chains of conventional type where tightening means of various sorts are provided to take care of play in avoidance of the toggle and gripping actions which characterize the present invention.

While preferred forms of the invention have been described, it is to be understood other modifications may be made within the scope of the appended claims, and it is to be understood features of each modification may be utilized with the other. For example, the cross-chain 13 of Fig. 1, adjacent the member 19 may be replaced by a removable cross-chain having snap hooks on both ends, similar to the cross-chain 13C and snap hook 29 of Fig. 6. The modification of Fig. 1 may then be readily applied without need to jack up a wheel. Similarly the long link 26 may be included in the arrangement of Fig. 1.

What is claimed is:

1. An anti-skid device for the rubber-tired wheel of a vehicle comprising a pair of rings for disposition on opposite sides of the tire, each of said rings being of resilient one-piece construction, of unstressed diameter less than the outer diameter of said tire and having terminal portions separated by a gap permitting it to be sprung over said tire, a plurality of spaced cross-chains each pivotally secured at its opposite ends to said rings and held by them in spaced relation during and after mounting of the device as a unit on the tire, and means for closing said gaps of each of the rings of the device as mounted, said closing means comprising disengageable locking members respectively connected to terminal portions of the associated ring and being of a length sufficient to bridge the gaps thereof when said rings are mounted on said tire and are in unstressed condition, whereby when the locking members are locked, expansion of the rings by centrifugal force is precluded.

2. An anti-skid device for the rubber-tired wheel of a vehicle comprising a pair of rings for disposition on opposite sides of the tire, one of said rings being of one-piece circumferentially continuous construction of diameter less than the outer diameter of said tire and the second of them being of resilient one-piece construction, of unstressed diameter less than the outer diameter of said tire and having terminal portions separated by a gap, a plurality of spaced cross-chains each pivotally secured at its opposite ends to said rings, and locking means on said terminal portions of said resilient ring of length sufficient to bridge said gap when said device is mounted on the tire and said second ring is in unstressed condition, said locking means when locked precluding expansion of said second ring by centrifugal force and being releasable to allow manual expansion of said second ring to diameter greater than said wheel in mounting and removal of said device.

3. An anti-skid device for the rubber-tired wheel of a vehicle comprising a pair of rings for disposition on opposite sides of the tire and of diameter less than the outer diameter of said tire, at least one of said rings being of resilient one-piece construction, of unstressed diameter less than the outer diameter of said tire and having terminal portions separated by a gap for expansion manually to diameter greater than the outer diameter of said tire during mounting on the tire and removal from the tire of said device, means for closing said gap to preclude expansion of said resilient ring by centrifugal force to diameter greater than the outer diameter of said tire comprising disengageable locking members respectively connected to said terminal portions and of combined length sufficient to bridge said gap therebetween when said device is mounted on the tire and said resilient ring is in unstressed condition, a plurality of eye members spaced circumferentially of each of said rings and including at least one eye member attached to said gap-closing means, and a plurality of spaced cross-chains connected between the corresponding eye members of the opposite rings and including at least one cross-chain detachably connected to the corresponding eye member of said gap-closing means.

4. An anti-skid device for a rubber-tired vehicle wheel comprising at least one resilient one-piece ring of unstressed diameter less than the outer diameter of said tire and provided with a gap permitting the ring manually to be sprung over the tire for mounting of the device thereon, a plurality of cross-chains attached to said ring and held by it in spaced relation during and after mounting of said device on the tire, and locking members attached to the ends of said ring of length sufficient to bridge said gap when said device is mounted on the tire and said ring is in unstressed condition, said members when locked together precluding expansion of said ring by centrifugal force to diameter greater than the outer diameter of said tire and being separable to allow said ring manually to be sprung to diameter greater than the outer diameter of said tire in mounting thereon or removal therefrom of said device.

5. An anti-skid device for a rubber-tired vehicle wheel comprising two one-piece rings of diameter less than the outer diameter of said tire for disposition on opposite sides thereof, at lease one of said rings being resilient, of unstressed diameter less than the outer diameter of said tire and having ends spaced by a gap, a plurality of cross-chains attached to said rings and held by them in spaced relation during and after mounting of said device on the tire, and locking means of length sufficient to bridge the gap between and detachably to connect said ring ends when said device is mounted on the tire and said ring is in unstressed condition, said locking means when locked precluding expansion by centrifugal force of said resilient ring after mounting of said device on the tire and when unlocked permitting manual expansion of said resilient ring to diameter sufficient to pass over said tire in mounting thereon or removal therefrom of the device.

6. An anti-skid device for a rubber-tired vehicle wheel comprising two one-piece rings of diameter less than the outer diameter of said tire for disposition on opposite sides thereof, at least one of said rings being resilient, of unstressed diameter less than the outer diameter of said tire and having ends spaced by a gap, a plurality of cross-chains attached to said rings and held by them in spaced relation during and after mounting of said device on the tire, and locking means for said ring ends of length sufficient to bring the gap between them when said resilient ring is in unstressed condition, said locking means when locked with the device mounted on the tire precluding expansion of said resilient ring by centrifugal force and when released permitting manual expansion of said resilient ring to diameter sufficient to pass over said tire in mounting thereon or removal therefrom of the device, one of said cross-chains being connected between said rings in the region of said locking means and detachable to permit mounting or removal of the device without jacking up the wheel.

7. An anti-skid device for a rubber-tired vehicle wheel comprising at least one resilient one-piece ring, of unstressed diameter less than the outer diameter of said tire and provided with a gap permitting the ring manually to be sprung over the tire in mounting thereon or removal therefrom of said device, a plurality of cross-chains attached to said ring and held by it in spaced relation during and after mounting of the device, and locking means comprising members attached to the ends of said ring and jointly of length sufficient to bridge said gap therebetween when said resilient ring is in unstressed condition, said members when locked together with the device mounted on the tire precluding expansion of said ring by centrifugal force and when unlocked permitting manual springing of the ring to diameter greater than the outer diameter of the tire in mounting thereon or removal therefrom of said device, one of said cross-chains being connected between said rings in the region of said locking means and detachable to permit mounting or removal of the device without jacking up the wheel.

PAUL A. NEWMAN.

REFERENCES CITED

The following references are of record in the file of this patent:

UNITED STATES PATENTS

| Number | Name | Date |
|---|---|---|
| 1,248,212 | Walden | Nov. 27, 1917 |
| 1,400,896 | Mestars | Dec. 20, 1921 |
| 1,478,059 | Pye | Dec. 18, 1923 |
| 1,595,339 | Brittain | Aug. 10, 1926 |
| 2,252,778 | Morss | Aug. 19, 1941 |
| 2,326,618 | Carlson | Aug. 10, 1943 |
| 2,328,808 | Holtz | Sept. 7, 1943 |
| 2,427,973 | Merritt | Sept. 23, 1947 |